United States Patent [19]

Yabuno et al.

[11] Patent Number: 5,068,964

[45] Date of Patent: Dec. 3, 1991

[54] METHOD OF MAKING POLY-V GROOVED PULLEY

[75] Inventors: Ryohei Yabuno, Toyota; Shin Takeda, Aichi, both of Japan

[73] Assignee: Aisin Seiki Kabushiki Kaisha, Kariya, Japan

[21] Appl. No.: 477,127

[22] Filed: Feb. 7, 1990

Related U.S. Application Data

[63] Continuation of Ser. No. 304,903, Feb. 1, 1989, abandoned, which is a continuation of Ser. No. 386,528, Jun. 9, 1982, abandoned.

[30] Foreign Application Priority Data

Jun. 18, 1981 [JP] Japan ............... 56-094353

[51] Int. Cl.⁵ ............................. B21K 1/42
[52] U.S. Cl. ...................... 29/892.3; 72/348
[58] Field of Search ............ 29/892, 892.3; 72/68, 72/347–350; 474/168–170

[56] References Cited

U.S. PATENT DOCUMENTS

| 1,383,747 | 7/1921 | Noble | 72/347 |
|---|---|---|---|
| 2,869,223 | 1/1959 | Killian et al. | 29/159 R |
| 3,080,644 | 3/1963 | Previte et al. | 29/159 R |
| 3,368,376 | 2/1968 | Previte | 29/159 R |
| 3,851,366 | 12/1974 | Jacobs | 72/348 |
| 3,977,264 | 8/1976 | Sproul | 29/159 R |
| 4,109,542 | 8/1978 | Kraft | 474/174 |
| 4,273,547 | 6/1981 | Bytzek | 29/159.3 |
| 4,313,323 | 2/1982 | Kanemitsu | 29/159 R |

FOREIGN PATENT DOCUMENTS

| 3042312A1 | 8/1982 | Fed. Rep. of Germany . |
|---|---|---|
| 2306761 | 11/1976 | France . |
| 11817 | 3/1980 | Japan . |
| 59544 | 5/1981 | Japan . |
| 59546 | 5/1981 | Japan . |
| 625768 | 7/1949 | United Kingdom . |
| 436340 | 10/1955 | United Kingdom . |
| 1152673 | 5/1969 | United Kingdom . |
| 1500637 | 2/1978 | United Kingdom . |
| 1507123 | 4/1978 | United Kingdom . |
| 2055065A | 2/1981 | United Kingdom . |

OTHER PUBLICATIONS

Konstruktionen in Blech und in Druckgusse, Von Pro. Dr.-Ing Gerhard Oehler, Klepzig Fachberichte 81 (1973), pp. 195-197.

Primary Examiner—P. W. Echols
Attorney, Agent, or Firm—Oblon, Spivak, McClelland, Maier & Neustadt

[57] ABSTRACT

In a method of making a poly-V grooved pulley from a circular flat plate of sheet metal of a predetermined thickness, the central portion of the parent flat plate is pressed to form a cup-shaped blank integral with a circular flat peripheral flange of the same thickness as that of the parent flat plate, the cup-shaped blank having a predetermined thickness thinner than that of the parent flat plate. The cup-shaped blank is pressed to form a hub wall, and the circular flat peripheral flange is drawn to form a cylindrical pulley flange wall. At the final stage, the cylindrical pulley flange wall is formed in its exterior periphery with a plurality of V-shaped grooves for a poly-V belt.

5 Claims, 2 Drawing Sheets

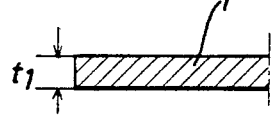
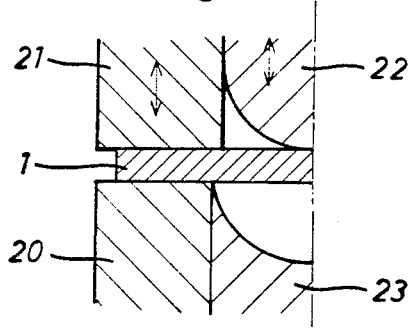
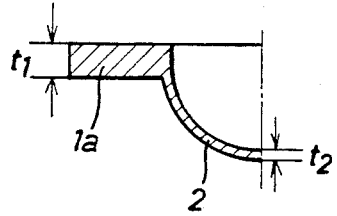
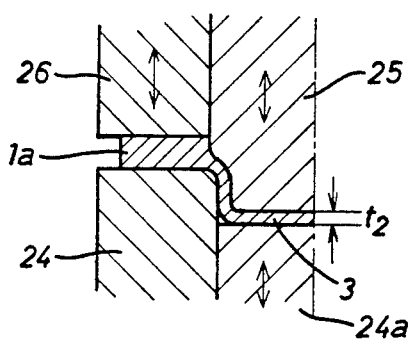
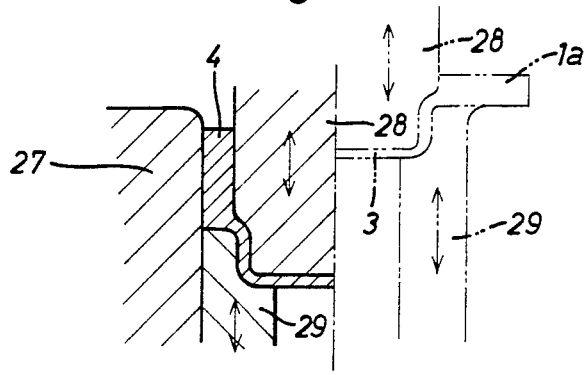
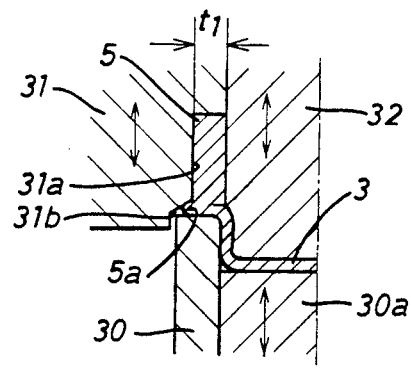
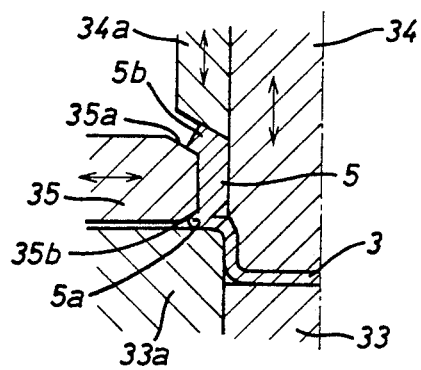

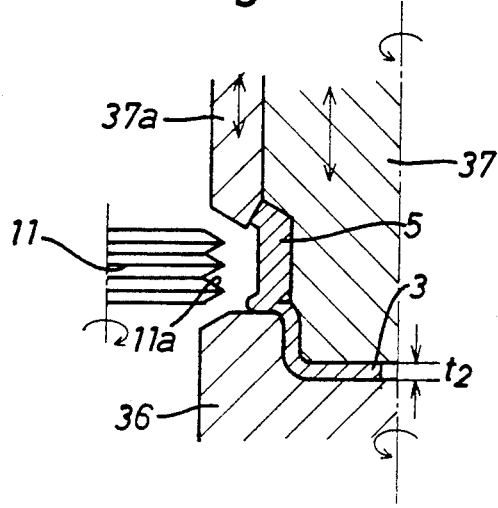
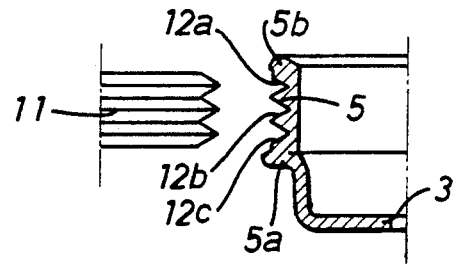
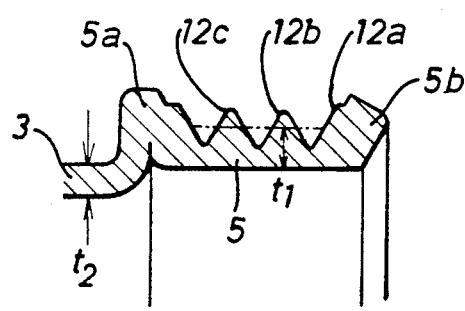
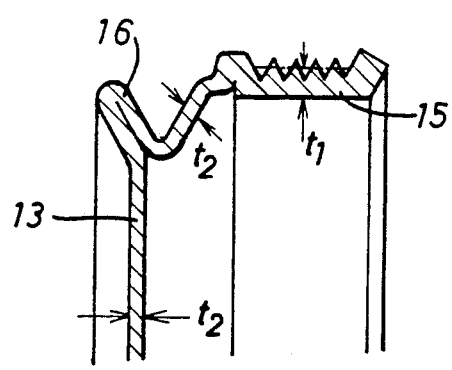
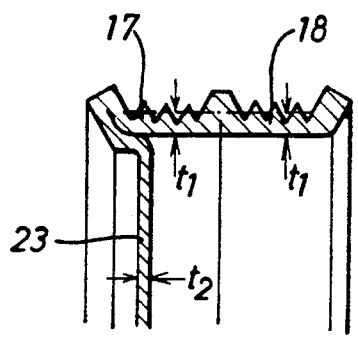

METHOD OF MAKING POLY-V GROOVED PULLEY

This application is a continuation of application Ser. No. 07/304,903, filed on Feb. 1, 1989, now abandoned, which is a continuation of application Ser. No. 386,528, filed on June 9, 1982, now abandoned.

BACKGROUND OF THE INVENTION

1. Field of the invention

The present invention relates to a poly-V grooved pulley of light-weight sheet metal for use with a poly-V belt in drive systems, and more particularly to an improved method for manufacturing a poly-V grooved pulley having a hub wall and a cylindrical poly-V grooved flange wall integral with the hub wall.

2. Description of the Prior Art

As is pointed out in the specification of U.S. Pat. No. 3,977,264 of Sproul, prior poly-V grooved pulleys, such as shown in U.S. Pat. No. 3,368,376 of Previte, have had groove-forming walls which are thinner than the parent metal in the pulley flange in which the grooves are formed; which are non-uniform in thickness because of a different inner and outer angular contour of the V-groove formations; and which inherently involve stretching the metal in the V-groove walls. This results in insufficient strength and rigidity of the pulley, causing undesirable cracks in the pulley during operation under heavy loading.

To overcome such drawbacks as described above, it has been proposed to provide a sheet metal poly-V pulley structure having roller spun cold-worked thickened groove-forming walls provided with a plurality of relatively narrow deep V-grooves formed in an axially extending pulley flange wall, as has been disclosed in U.S. Pat. No. 3,977,264 of Sproul. During the manufacturing processes of the poly-V grooved pulley of Sproul, rounded V-shaped groove walls forming the valleys and crests in the stage blank are axially squeezed and compressed to each other to form a sinuous-shaped flange wall in which the metal is roller worked, compressed, displaced and extruded in various zones to form the V-shaped pulley grooves. In such manufacturing processes, buckling portions inevitably occur between the inner rounded surfaces of the thickened valley walls, which result in undesirable cracks in the V-grooved flange wall during operation under heavy loading.

For the purpose of overcoming similar problems in the prior art, it has been proposed to thicken the appropriately cylindrical flange wall portion of a pulley blank without thickening the hub portion of pulley blank so that the flange wall portion will be thicker than the thickness of the parent metal used to form the pulley blank, as has been described in U.S. Pat. No. 4,273,547 of Bytzek. During the process of thickening the parent metal, the flange wall portion is partially collapsed in an axial direction, and the exterior periphery of the partially collapsed section is rolled while the interior periphery of the same is supported in a straight axially extending configuration thereby to form the V-shaped pulley grooves in the thickened flange wall portion. In such formation of the thickened poly-V grooved pulley flange, it is, however, difficult to uniformly collapse the cylindrical flange wall portion without buckling in its metal, and it is further difficult to precisely form the V-shaped pulley grooves by rolling in the thickened flange wall without any interengaged portions. The difficulties will increase if the collapsing process is adapted to thicken the flange wall portion in a wider area. For this reason, it is apparent that if the flange wall portion is collapsed in an irregular manner, there will occur undesirable buckling in the thickened flange wall, resulting in cracks in the poly-V grooved pulley during operation under heavy loading.

SUMMARY OF THE INVENTION

It is, therefore, a primary object of the present invention to provide an improved method capable of forming a poly-V grooved pulley flange in a precise manner without causing any buckling in its cold-worked metal during the manufacturing processes of the pulley.

Another object of the present invention is to provide an improved method capable of forming at least a pair of parallel poly-V grooved pulley flange walls or a poly-V grooved pulley flange wall with a single V-shaped pulley flange in a simple manner without causing any buckling in its cold-worked metal during the manufacturing processes of the pulley.

According to one aspect of the present invention, there is provided a poly-V grooved pulley formed from a circular flat plate of sheet metal of a predetermined thickness, which comprises a hub wall formed by pressing the central portion of the parent flat plate and having a predetermined thickness thinner than that of the parent flat plate, and a cylindrical pulley flange wall formed by drawing a circular flat peripheral flange portion of the parent flat plate after formation of the hub wall, the pulley flange wall being formed in its exterior periphery with a plurality of V-shaped grooves.

According to another aspect of the present invention, there is provided a method of making a poly-V grooved pulley from a circular flat plate of sheet metal of a predetermined thickness, which method comprises the steps of:

pressing the central portion of the parent flat plate to form a cup-shaped blank integral with a circular flat peripheral flange of the same thickness as that of the parent flat plate, the cup-shaped blank having a predetermined thickness thinner than that of the parent flat plate, forming a hub wall from the cup-shaped blank in the same thickness as that of the cup-shaped blank, drawing the circular flat peripheral flange into a cylindrical flange wall in the same thickness as that of the parent flat plate, and forming a plurality of V-shaped grooves in the cylindrical flange wall.

In the practices of the method, it is preferable that after the step of drawing the circular flat peripheral flange, the cylindrical flange wall is radially inwardly squeezed to form a first tapered annular shoulder adjacent the hub wall, and the squeezed cylindrical flange wall is radially outwardly bent at its open end to form a second tapered annular shoulder.

BRIEF DESCRIPTION OF THE DRAWINGS

Additional objects and advantages of the present invention will be readily apparent from the following detailed description of the preferred embodiments thereof made with reference to the accompanying drawings in which:

FIG. 1 is a fragmentary cross-sectional view of a circular flat plate of sheet metal of a predetermined thickness from which a poly-V grooved pulley may be formed;

FIG. 2 is a fragmentary cross-sectional view illustrating punches and dies of a press for pressing the central portion of the parent flat plate of FIG. 1;

FIG. 3 illustrates a fragmentary cross-section of a spherically-shaped blank with a circular flat peripheral flange formed by pressing the parent flat plate;

FIG. 4 is a fragmentary cross-sectional view illustrating punches and dies of the press for forming a hub wall from the spherically-shaped blank of FIG. 3;

FIG. 5 is a fragmentary cross-sectional view illustrating a die ring and punches of the press for drawing the circular flat peripheral flange of the hub wall in an axial direction to form a cylindrical flange wall;

FIG. 6 is a fragmentary cross-sectional view illustrating a punch, a mandrel and dies of the press for squeezing radially inwardly the drawn cylindrical flange wall to form a tapered annular shoulder adjacent the hub wall;

FIG. 7 is a fragmentary cross-sectional view illustrating a punch ring, radial retaining segments, a mandrel and dies of the press for radially outwardly bending an open end of the squeezed cylindrical flange wall to form an outside tapered annular shoulder;

FIGS. 8 and 9 illustrate successive steps in the forming of poly-V grooves in the squeezed cylindrical flange wall;

FIG. 10 is an enlarged fragmentary cross-sectional view showing the contour of the rolled cylindrical flange wall formed with poly-V grooves in the pulley of FIG. 9;

FIG. 11 is an enlarged fragmentary cross-sectional view of a modification of the poly-V grooved pulley; and FIG. 12 is an enlarged fragmentary cross-sectional view of another modification of the poly-V grooved pulley.

DESCRIPTION OF THE PREFERRED EMBODIMENTS

In manufacturing processes of a poly-V grooved pulley in accordance with the present invention, such a circular flat plate 1 of uniform thickness sheet metal as shown in FIG. 1 is used, which has for example a predetermined diameter for a poly-V grooved pulley of 110 mm in diameter and a predetermined thickness of 3.2 mm suitable for forming poly-V grooves in the pulley flange wall at the final stage of the manufacturing processes. At the first stage of manufacture of the poly-V grooved pulley, the circular flat plate 1 of sheet metal is mounted on a lower annular die 20 and centered at its outer periphery in usual manner when the press is open. An upper annular die 21 is moved axially toward the lower die 20 to clamp the outer peripheral portion of flat plate 1 in position, as shown in FIG. 2. Successively, the clamped flat plate 1 is uniformly pressed at its central portion under pressure of approximately 60 tons between upper and lower punches 22 and 23 upon downward movement of the upper punch 22 to form a spherically-shaped blank 2 integral with a circular flat peripheral flange 1a of the same thickness t₁ as that of the parent flat plate 1. After formation of the spherically-shaped blank 2, the upper die 21 and punch 2 are moved upward, and the spherically-shaped blank 2 is knocked out in a usual manner by upward movement of a knockout pin (not shown). As shown in FIG. 3, the spherically-shaped blank 2 has a predetermined thickness $t_2$ of approximately 1.6 mm which is half of the thickness $t_1$ of the flat peripheral flange 1a.

At the second stage of manufacture of the poly-V grooved pulley, the spherically-shaped blank 2 is mounted on a lower die 24a, as shown in FIG. 4, which die 24a is provided at its bottom portion with a conventional cushion (not shown), and the flat peripheral flange 1a of blank 2 is centered at its outer periphery in a usual manner and clamped in position between upper and lower die rings 26 and 24. Thus, an inner punch 25 is moved axially toward the lower die 24a and presses the spherically-shaped blank 2 under pressure of approximately 110 tons at its downward stroke end to form a hub wall 3 integral with the circular flat peripheral flange 1a. The hub wall 3 has substantially the same thickness as that of the spherically-shaped blank 2.

At the third stage of manufacture of the poly-V grooved pulley, as shown by imaginary lines in FIG. 5, the circular flat peripheral flange 1a is mounted on a die ring 27 and centered by engagement of the hub wall 3 with the corresponding cavity wall of an inner die 29. Thus, an upper punch 28 is moved axially toward the inner die 29 and abuts against the hub wall 3 to draw the circular flat peripheral flange 1a into a cylindrical flange wall 4 under pressure of approximately 50-60 tons. The drawn cylindrical flange wall 4 is removed by upward movement of a knock-out pin (not shown) after the punch 28 is moved to its raised position.

As shown in FIG. 6, the drawn cylindrical flange wall 4 integral with the hub wall 3 is mounted on a die ring 30 and a knock-out member 30a and successively clamped by a mandrel 32 in position. Thus, an annular punch 31 is moved downward to radially inwardly squeeze the cylindrical flange wall under pressure of approximately 50 tons to form a tapered annular shoulder 5a adjacent the hub wall 3. For squeezing the cylindrical flange wall 4, the annular punch 31 is formed at its inner periphery with an annular stepped portion 31a and a tapered annular squeezing surface 31b. At the next stage, the squeezed flange wall 5 and hub wall 3 are mounted on a lower die 33a and a knock-out member 33, as shown in FIG. 7. The hub wall 3 is clamped by a mandrel 34 in axial direction and the squeezed flange wall 5 is clamped by split die segments 35 in a radial direction. Under such clamped condition, an upper open end of the squeezed flange wall 5 is radially outwardly bent by an annular knife-edge of upper punch 34a to form an outside tapered annular shoulder 5b, leaving only the length between annular shoulders 5a and 5b as the cylindrical flange wall. After the formation of outside tapered annular shoulder 5b, the hub wall 3 is pierced in its center by a hole in a conventional manner for registration on roller spinning dies, and other holes may be pierced for use as bolt holes. It should be noted that since the cylindrical flange wall 5 is not axially collapsed, but instead retains its initial thickness $t_1$, it is not work hardened by a step of axially collapsing and folding the same.

In FIGS. 8 and 9 there is illustrated a final poly-V groove roller spinning operation during which the metal in the squeezed flange wall 5 is roller worked to form a plurality of V-shaped pulley grooves 12a, 12b, 12c. This roller spinning operation may be carried out in the roller spinning dies which includes a lower die 36, a mandrel 37 arranged coaxial with lower die 36 on a common spinner axis, an annular blank holder 37a, and a V-grooved spinning roll 11 mounted adjacent the mandrel 37 and lower die 36 for movement toward and away from the spinner axis. In operation, the mandrel 37 is separated, and the cylindrical flange wall 5 and hub wall 3 are mounted on the lower die 36, being centered by engagement with the cavity wall of lower die 36. The mandrel 37 and blank holder 37a are moved axially toward the lower die 36 clamping the flange wall 5 and hub wall 3 between them. The die 36, mandrel 37, blank holder 37a and the flange wall 5 and hub wall 3 clamped between them are rotated, and the spinning roll 11 is moved toward the exterior periphery of flange 5. Thus, the V-shaped pulley grooves 12a, 12b, 12c are formed in the flange wall 5 in a precise manner as shown in FIG. 9. During the groove-forming operation, a certain amount of metal flow occurs in the groove forming walls, and this metal flow acts to strengthen the groove forming walls without causing any buckling in the flange wall 5. FIG. 10 illustrates the contour of the rolled cylindrical flange wall 5 formed with poly-V grooves 12a, 12b, 12c, in which a distance between an imaginary line and the interior periphery of flange wall 5 indicates the original thickness $t_1$ of the parent flat plate 1, and the thickness of hub wall 3 is indicated by the reference numeral $t_2$ because of the same thickness as that of the spherically-shaped blank 2 of FIG. 3.

In the actual practice of the present invention, if the diameter of the parent flat plate 1 of FIG. 1 is appropriately determined for a large pressing depth of hub wall 3 in FIG. 4, a single V-shaped groove 16 for a single V-belt can be formed by rolling prior to or during the groove forming operation described above, as shown in FIG. 11. In the figure, the reference numeral 13 indicates a hub wall corresponding with the hub wall 3, and the reference numeral 15 indicates a poly-V grooved pulley flange wall corresponding with the poly-V grooved pulley flange 5. Alternatively, in the case that the diameter of the parent, flat plate 1 of FIG. 1 is appropriately determined for a large circular flat peripheral flange 1a of spherically-shaped blank 2 in FIG. 3, a pair of parallel poly-V grooved flange walls 17 and 18 can be formed during the groove forming operation described above.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method of making a pulley with a plurality of V-shaped grooves from a flat circular parent metal plate having a predetermined thickness, the method comprising the steps of:

clamping the outer peripheral portion of said parent metal plate between two dies;

pressing the central portion of said clamped flat circular parent metal plate to form a flat annular peripheral flange integral with said spherical blank, wherein said peripheral flange is not drawn and retains the same thickness as that of said parent metal plate;

pressing the spherical blank into a hub wall having the same thickness as said spherical blank;

forming the flat annular peripheral flange into a cylindrical flange wall having the same thickness as that of said parent metal plate without axially collapsing said cylindrical flange wall;

forming a tapered annular shoulder merging with an open end of the uncollapsed cylindrical wall; and rolling the uncollapsed cylindrical flange wall to form the V-shaped grooves in the exterior periphery of the cylindrical flange wall, wherein the thickness of said flange wall is unchanged prior to said rolling step and is not greater than that of said parent metal plate prior to said rolling step, and wherein said cylindrical flange wall is not work hardened by a step of axially collapsing and folding said flange wall.

2. A method as claimed in claim 1, wherein the diameter of said flat circular parent metal plate is selected for a large drawing depth of the hub wall so as to form a single V-shaped groove for a single belt adjacent the cylindrical flange wall by rolling no later than during the groove forming process.

3. A method as claimed in claim 1, wherein the diameter of said flat circular parent metal plate is selected for a large flat annular peripheral flange in width so as to form a pair of parallel cylindrical flange walls in the exterior periphery of which a plurality of V-shaped grooves are formed by rolling respectively.

4. The method of claim 1 wherein said flat circular parent metal plate has a uniform thickness.

5. The method of claim 1, including the step of forming another tapered annular shoulder adjacent the hub wall.

* * * * *